(12) United States Patent
Maeda

(10) Patent No.: US 8,050,514 B2
(45) Date of Patent: Nov. 1, 2011

(54) IMAGE PROCESSING APPARATUS AND IMAGE PROCESSING METHOD

(75) Inventor: Mitsuru Maeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 826 days.

(21) Appl. No.: 12/123,907

(22) Filed: May 20, 2008

(65) Prior Publication Data

US 2008/0298685 A1 Dec. 4, 2008

(30) Foreign Application Priority Data

May 29, 2007 (JP) ................................. 2007-142321

(51) Int. Cl.
*G06K 9/40* (2006.01)

(52) U.S. Cl. ........................................ 382/274; 382/168

(58) Field of Classification Search .................. 382/103, 382/107, 167, 168, 169, 172, 173, 195, 274
See application file for complete search history.

(56) References Cited

U.S. PATENT DOCUMENTS

| 4,801,956 A | 1/1989 | Kinoshita et al. ................. 354/3 |
| 5,086,487 A | 2/1992 | Katayama et al. ............... 382/56 |
| 5,138,672 A | 8/1992 | Hirabayashi et al. ........... 382/54 |
| 5,343,218 A | 8/1994 | Maeda ........................... 345/116 |
| 6,236,751 B1 * | 5/2001 | Farrell ........................... 382/168 |
| 7,362,368 B2 * | 4/2008 | Steinberg et al. ............. 348/349 |
| 7,903,168 B2 * | 3/2011 | Pillman et al. ................. 348/345 |

* cited by examiner

*Primary Examiner* — Phuoc Tran

(74) *Attorney, Agent, or Firm* — Fitzpatrick, Cella, Harper & Scinto

(57) ABSTRACT

In order to perform appropriate image correction considering the moving image region and static image region of image data forming a moving image, the image data forming the moving image is input in a unit of frame, the image data is divided into a moving image region and static image region, and a feature amount of the moving image region and that of the static image region are calculated. At least one table for image correction is generated based on the feature amount of the moving image region and that of the static image region, and the image data is corrected using the table.

11 Claims, 11 Drawing Sheets

IMAGE PROCESSING APPARATUS AND IMAGE PROCESSING METHOD

BACKGROUND OF THE INVENTION

1. Field of the Invention

The present invention relates to image processing for correcting a moving image.

2. Description of the Related Art

Various methods of controlling the contrast, white balance, color balance, or the like of image data by correcting the tone thereof been proposed. For example, as shown in FIG. 12, a tone correction method is available that determines the feature of an image based on the tonal range of the highlighted portion of the image and adjusts the degree of white balance correction based on the determination result. According to this method, it is possible to faithfully reproduce the object color by appropriately correcting the contrast, highlights, and shadows at the same time.

On the other hand, a moving image also requires image correction for the contrast, white balance, color balance, or the like of the image.

When the above-described tone correction method is applied to a moving image, the correction value differs in each frame since correction processing is performed for each frame. Accordingly, in a moving image, subtle changes between the frames may be greatly corrected, and the correction result may be reflected as unstable changes in the image upon playing the moving image. Particularly, since the image quality of a static image region such as a background is corrected based on a moving image region, an undesirable change sometimes occurs.

SUMMARY OF THE INVENTION

In one aspect, an image processing apparatus comprises an input section arranged to input image data forming a moving image in a unit of frame, a divider arranged to divide the image data into a moving image region and a static image region, a calculator arranged to calculate a feature amount of the moving image region and a feature amount of the static image region, a generator arranged to generate at least one table for image correction based on the feature amount of the moving image region and the feature amount of the static image region, and a corrector arranged to correct the image data using the table.

According to this aspect, it is possible to perform appropriate image correction processing of image data forming a moving image, which considers a moving image region and static image region. In addition, it is possible to perform image correction processing which prevents an unstable change in a static image region.

Further features of the present invention will become apparent from the following description of exemplary embodiments with reference to the attached drawings.

DESCRIPTION OF THE EMBODIMENTS

The present invention will be described hereinafter in detail based on preferred embodiments with reference to the accompanying drawings. Note that the arrangements shown in the embodiments described below are merely examples, and the present invention is not limited to the illustrated arrangements.

First Embodiment

[Arrangement of Apparatus]

Figure 1:
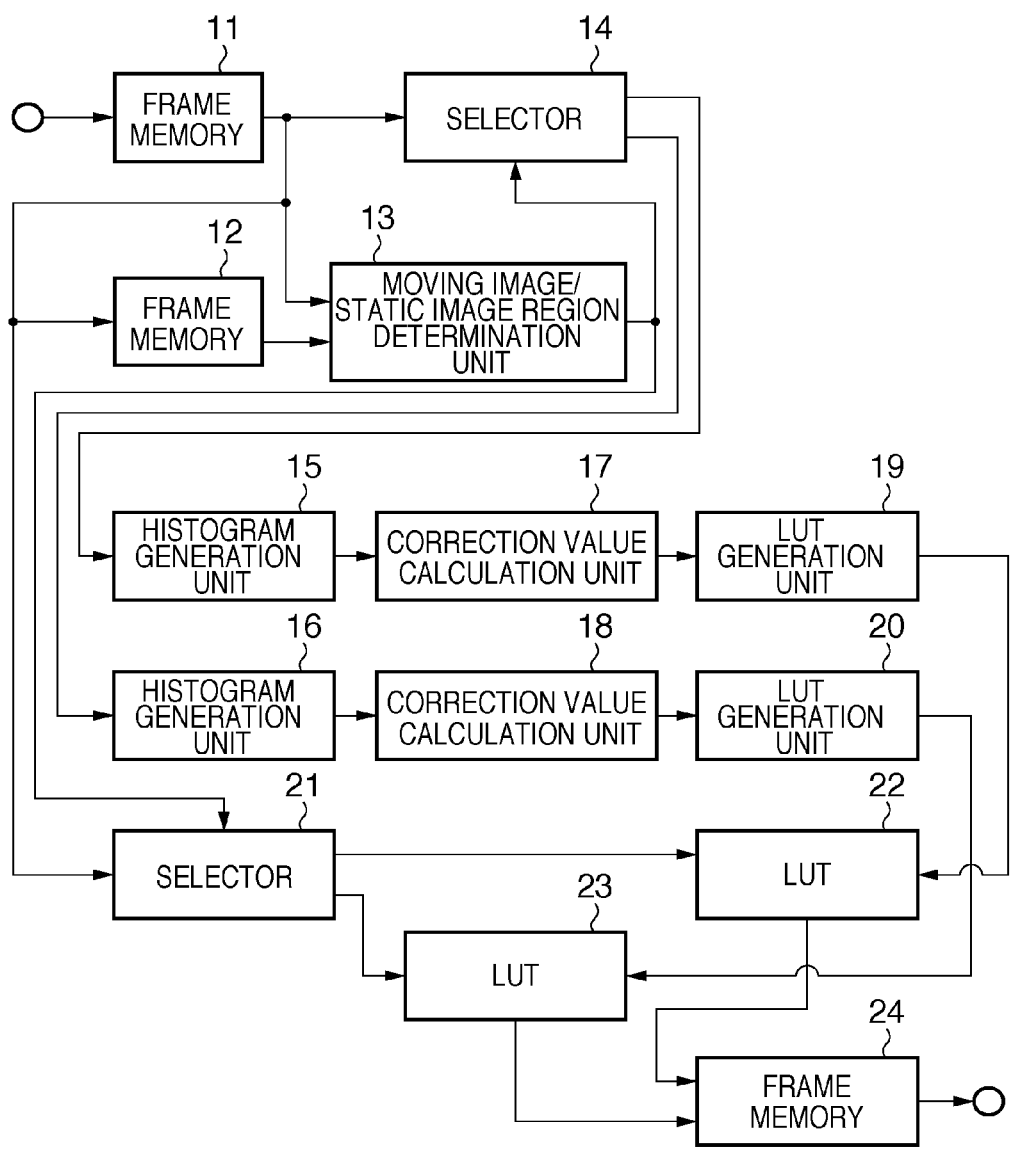
FIG. 1 is a block diagram showing the arrangement of an image processing apparatus in the first embodiment.

FIG. 1 is a block diagram showing the arrangement of an image processing apparatus in the first embodiment.

Referring to FIG. 1, frame memories 11 and 12 store the frame images of a moving image. The frame memory 11 stores an input frame image (to be referred to as a current frame image, hereinafter), and the frame memory 12 stores a frame image (to be referred to as a previous frame image, hereinafter) one frame before the current frame image. To simplify the explanation, an image to be processed is a frame image in this specification. However, a field image obtained for each field can be used as an image to be processed. A moving image/static image region determination unit 13 compares the current frame image in the frame memory 11 and the previous frame image in the frame memory 12 to determine a moving image region and a static image region. In this specification, a moving image region is a dynamic image region in the current frame image, and a static image region is an almost still image region in the current frame image. Each of selectors 14 and 21 reads out each pixel of the frame image from the frame memory 11, and switches the output destination of the pixel on the basis of the determination result by the moving image/static image region determination unit 13.

In order to simplify the explanation, the frame image is described as luminance data in which each color is represented by 8-bit data for each pixel, hereinafter, but the present invention is of course not limited to this example.

Each of histogram generation units 15 and 16 counts the frequency of occurrences of each luminance value of the frame image to generate a luminance histogram. The histogram generation unit 15 generates the luminance histogram of the pixels in the moving image region as a feature amount of the moving image region. The histogram generation unit 16 generates the luminance histogram of the pixels in the static image region as a feature amount of the static image region.

Each of correction value calculation units 17 and 18 calculates correction values for performing correction from the luminance histogram. The correction value calculation unit 17 generates correction values for the pixels in the moving image region. The correction value calculation unit 18 generates correction values for the pixels in the static image region. Note that a known method is applicable as the correction value calculation method in this embodiment, but a highlight value LH, a shadow value LS, and the like are calculated as the correction values herein.

Each of LUT generation units 19 and 20 generates tone correction table data based on the correction values. The LUT generation unit 19 generates table data for the pixels in the moving image region. The LUT generation unit 20 generates table data for the pixels in the static image region.

Lookup tables (LUTs) 22 and 23 store the table data generated by the LUT generation units 19 and 20, respectively. Each of the LUTs 22 and 23 inputs pixel data read out from the frame memory 11 for each pixel as an address, and outputs the data stored at this address in the table to correct the image. That is, the LUT 22 corrects the image in the moving image region, and the LUT 23 corrects the image in the static image region. A frame memory 24 stores the corrected frame image.

[Image Correction]

An image correction operation in the image processing apparatus with the arrangement shown in FIG. 1 will be described below.

Each frame image of a moving image is stored in the frame memory 11.

Figure 10:
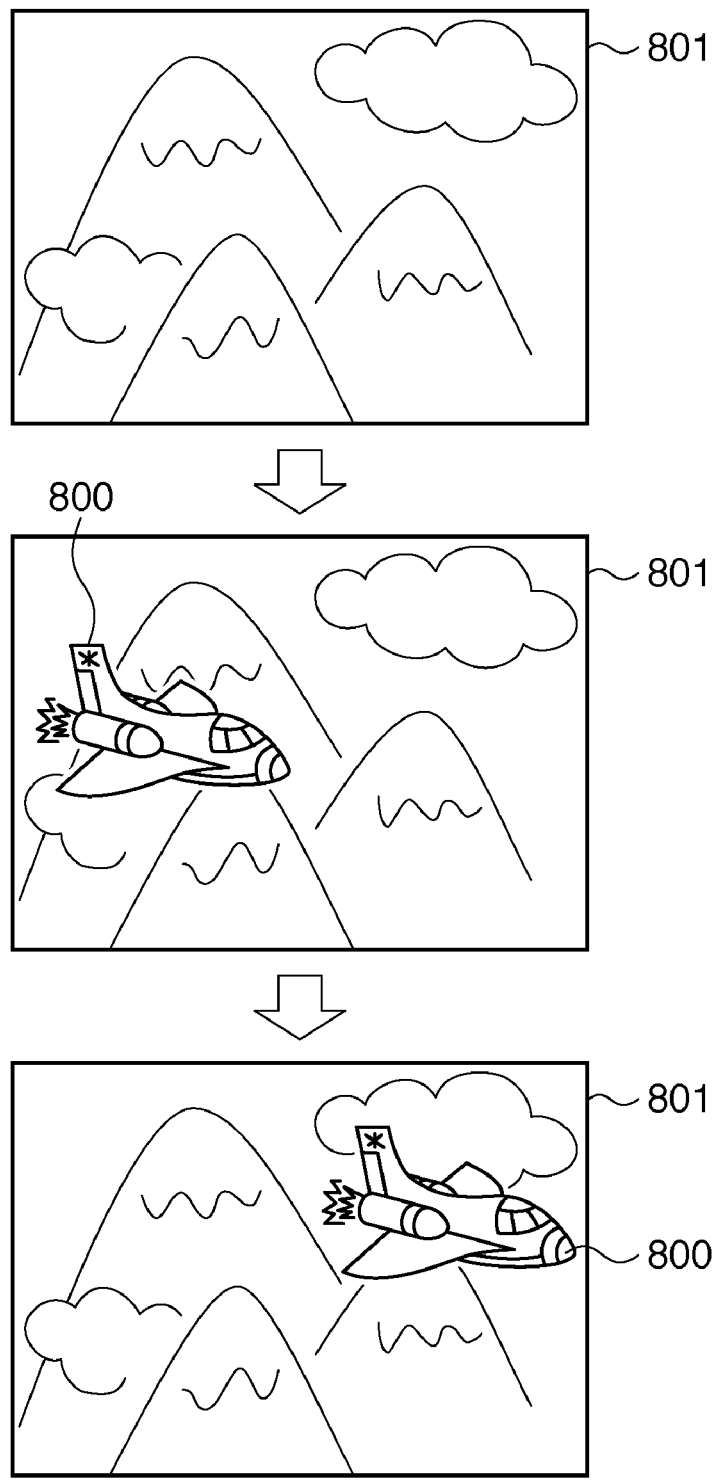
FIG. 10 shows views illustrating examples of the frame images of a moving image in the embodiment.
Figure 11:
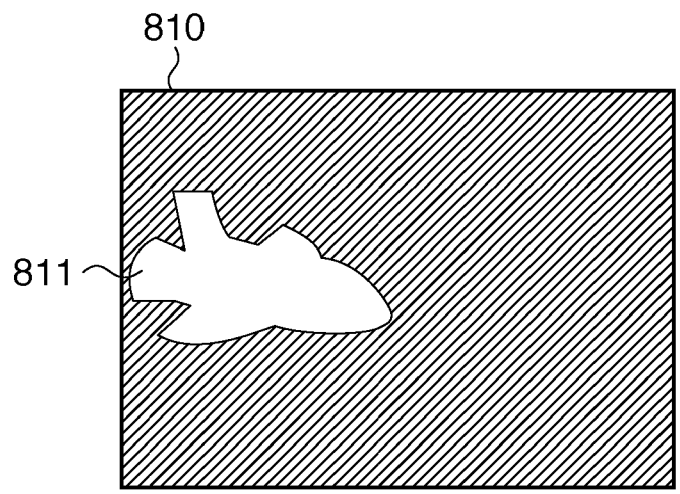
FIG. 11 is a view for explaining moving image/static image region determination in the embodiment.
Figure 12:
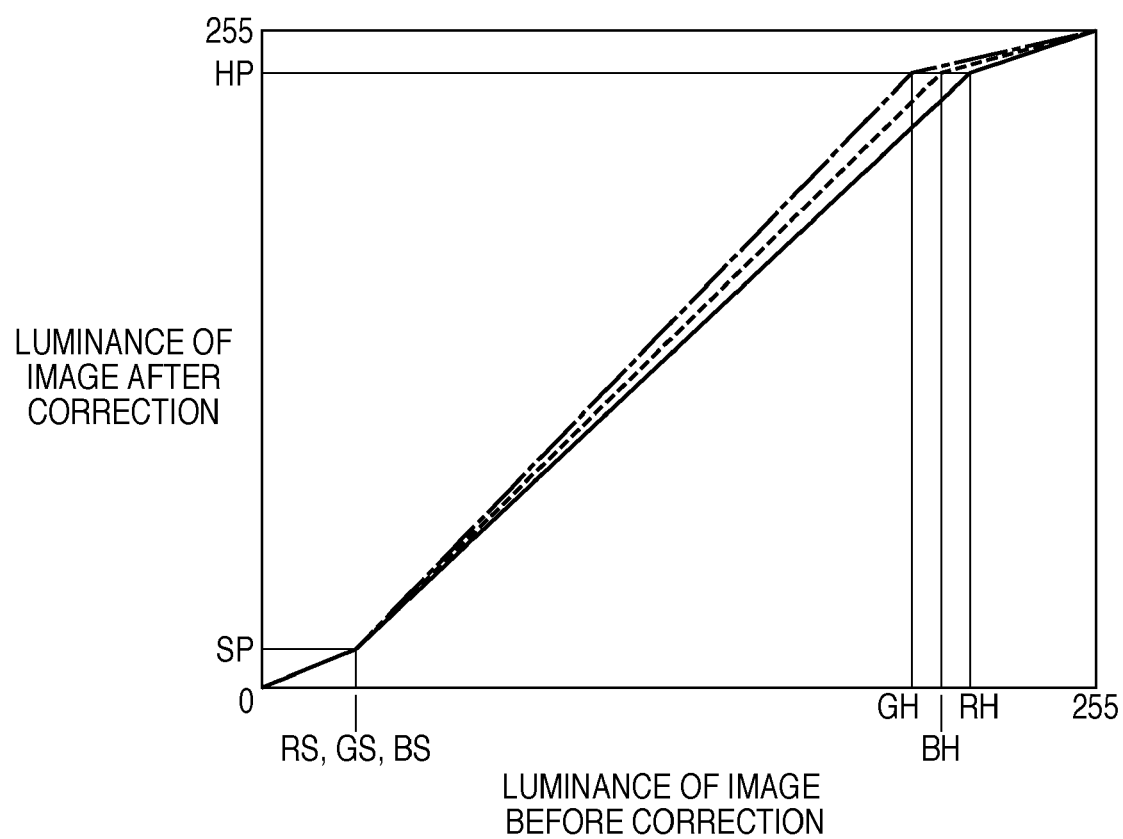
FIG. 12 is a graph showing an exemplary tone correction method.

The frame image stored in the frame memory 11 is input to the moving image/static image region determination unit 13 as a current frame image. A previous frame image stored in the frame memory 12 has also been input to the moving image/static image region determination unit 13. The moving image/static image region determination unit 13 compares these two frames to divide the frame into a moving image region and a static image region. Various known methods are applicable as the moving image region determination method. For example, it is possible to determine a moving image region with reference to the direction of a motion vector calculated by a block matching method or the edge. FIG. 10 illustrates how a moving image region is determined. FIG. 10 shows the frames of a moving image continuous from the upper frame to the lower frame through the middle frame. A background image 801 common to the respective frames is basically still. In the middle and lower frames, a moving airplane image 800 appears. For the upper frame which includes only the background, when the moving airplane image 800 enters the following middle frame, a moving image region 811 can be separated as shown in FIG. 11 by calculating the difference between the upper and middle frames. Note that a static image region 810 is hatched in FIG. 11.

The selector 14 reads out each pixel of the current frame image from the frame memory 11, and switches the output destination of the pixel to one of the histogram generation units 15 and 16 depending on the determination result by the moving image/static image region determination unit 13. That is, a pixel in the region determined to be the moving image region by the moving image/static image region determination unit 13 is output to the histogram generation unit 15, and a pixel in the region determined to be the static image region is output to the histogram generation unit 16.

The histogram generation unit 15 generates a luminance histogram of pixels included in the moving image region. For a luminance value P, the frequency value of the luminance histogram of the moving image region is represented by Hm(P) in the following description. At the timing of input of a frame image in the frame memory 11, the frequency values Hm(P) for all the luminance values P (P=0, . . . , 225) and a count value Cm obtained by counting the pixels included in the moving image region are reset as expressed by:

$$Hm(P)=0$$

$$Cm=0 \quad (1)$$

Letting the luminance value of the ith pixel of the current frame image be Pi, histogram data is generated by:

$$Hm(Pi)=Hm(Pi)+1$$

$$Cm=Cm+1 \quad (2)$$

Likewise, the histogram generation unit 16 generates a luminance histogram of pixels included in the static image region. For the luminance value P, let the frequency value of the luminance histogram of the static image region be Hs(P) and the count value obtained by counting the pixels included in the static image region be Cs, and the frequency value Hs(P) and count value Cs are reset and counted for the static image region as in the moving image region.

When generation and counting of the luminance histograms are complete for all the pixels in the current frame image, the obtained results are input to the correction value calculation units 17 and 18. The correction value calculation unit 17 calculates a highlight value LHm, a shadow value LSm, and the like of the moving image region. Likewise, the correction value calculation unit 18 calculates a highlight value LHs, a shadow value LSs, and the like of the static image region.

The correction values of the moving image region calculated as described above are input to the LUT generation unit 19, and those of static image region are input to the LUT generation unit 20. Each of the LUT generation units 19 and 20 generates table data indicating the relationship between the input values and the values after the image correction. The generated table data are stored in the LUTs 22 and 23, respectively.

The selector 21 reads out each pixel of the current frame image from the frame memory 11, and switches the output destination of the pixel to one of the LUTs 22 and 23 based on the determination result by the moving image/static image region determination unit 13. That is, pixel data included in the moving image region is input to the LUT 22, and that included in the static image region is input to the LUT 23.

The LUTs 22 and 23 correct the input pixels according to the table data stored in the respective LUTs, and store the correction results in the frame memory 24. The image data stored in the frame memory 24 is output to the outside of the image processing apparatus for each frame. After that, the frame image in the frame memory 11 is transferred to the frame memory 12.

Figure 2:
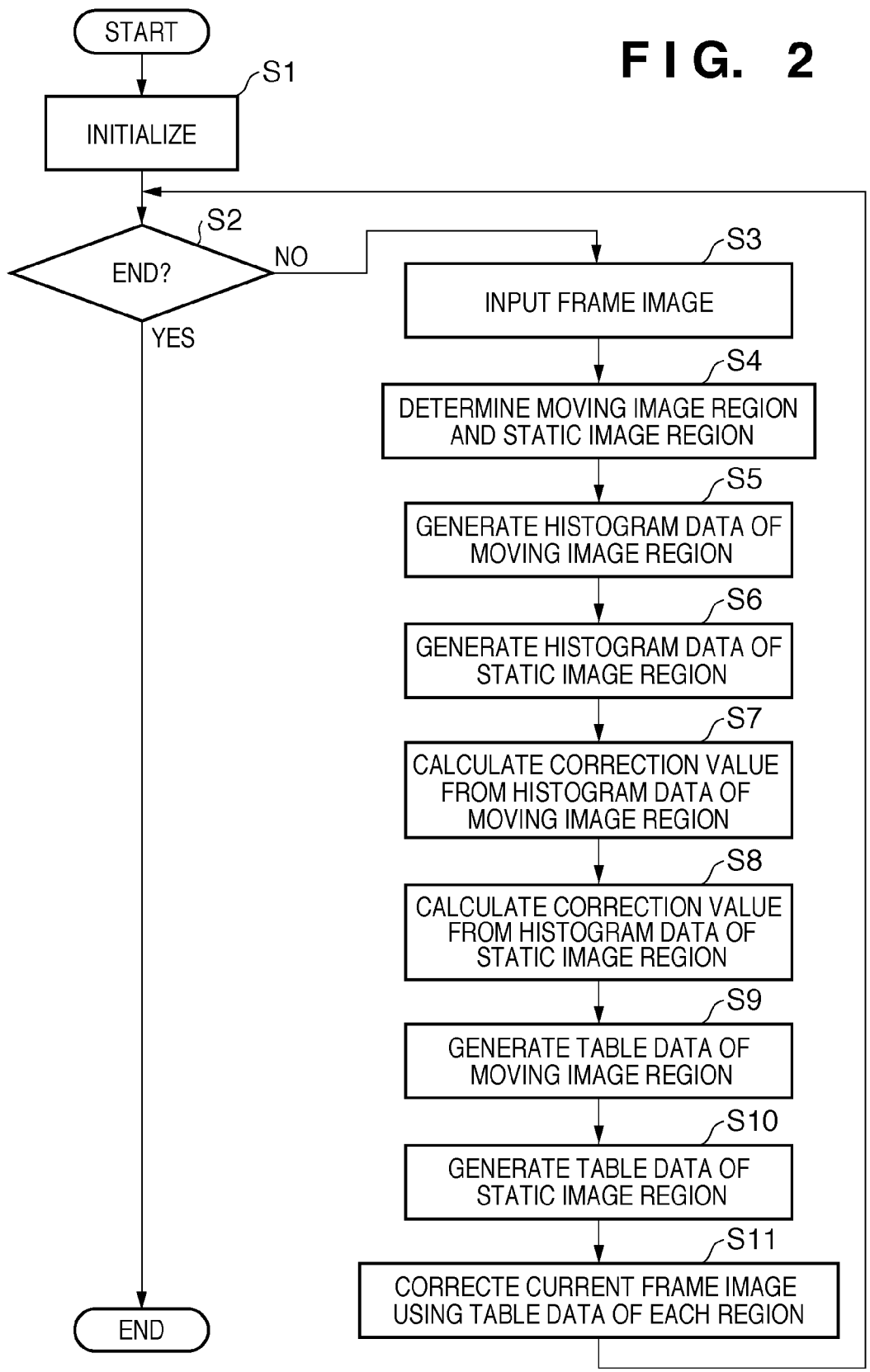
FIG. 2 is a flowchart illustrating image correction processing in the first embodiment.

The sequence of the image processing in the image processing apparatus described above will be outlined using the flowchart shown in FIG. 2.

The respective components of the image processing apparatus are initialized (S1). With this step, the respective frame memories are cleared. Then, end determination is performed (S2). That is, if all the frame images in the moving image to be processed have been processed, the process ends. Otherwise, the process advances to step S3.

A frame image is input (S3), and the input frame image is divided into a moving image region and a static image region (S4). After being divided into these regions, the histogram data of the moving image region of the current frame image is generated (S5), and that of the static image region of the current frame image is generated (S6).

The correction values of the moving image region are calculated from the histogram data of the moving image region (S7), and those of the static image region are calculated from the histogram data of the static image region (S8).

The table data of the moving image region is generated from the correction values of the moving image region (S9), and that of the static image region is generated from the correction values of the static image region (S10).

Using the generated table data, each of the moving image region and static image region obtained by dividing the current frame image is corrected, and the frame image after the correction is output (S11). The process returns to step S2 to process the next frame image.

As has been described above, according to the first embodiment, a current frame image is divided into a moving image region and a static image region by the moving image/static image region determination unit 13 and the selector 14. The histogram generation unit 15 calculates the feature amount of the moving image region, and the histogram generation unit 16 calculates the feature amount of the static image region. The LUT generation units 19 and 20 generate correction tables on the basis of the feature amount of the moving image region and that of the static image region, respectively, and the current image is corrected for each region using the corresponding table.

In this manner, when a frame image is divided into a moving image region and a static image region to perform image processing such as tone correction, it is possible to perform image correction optimum to the respective regions.

Second Embodiment

The second embodiment according to the present invention will be described below.

[Arrangement of Apparatus]

Figure 3:
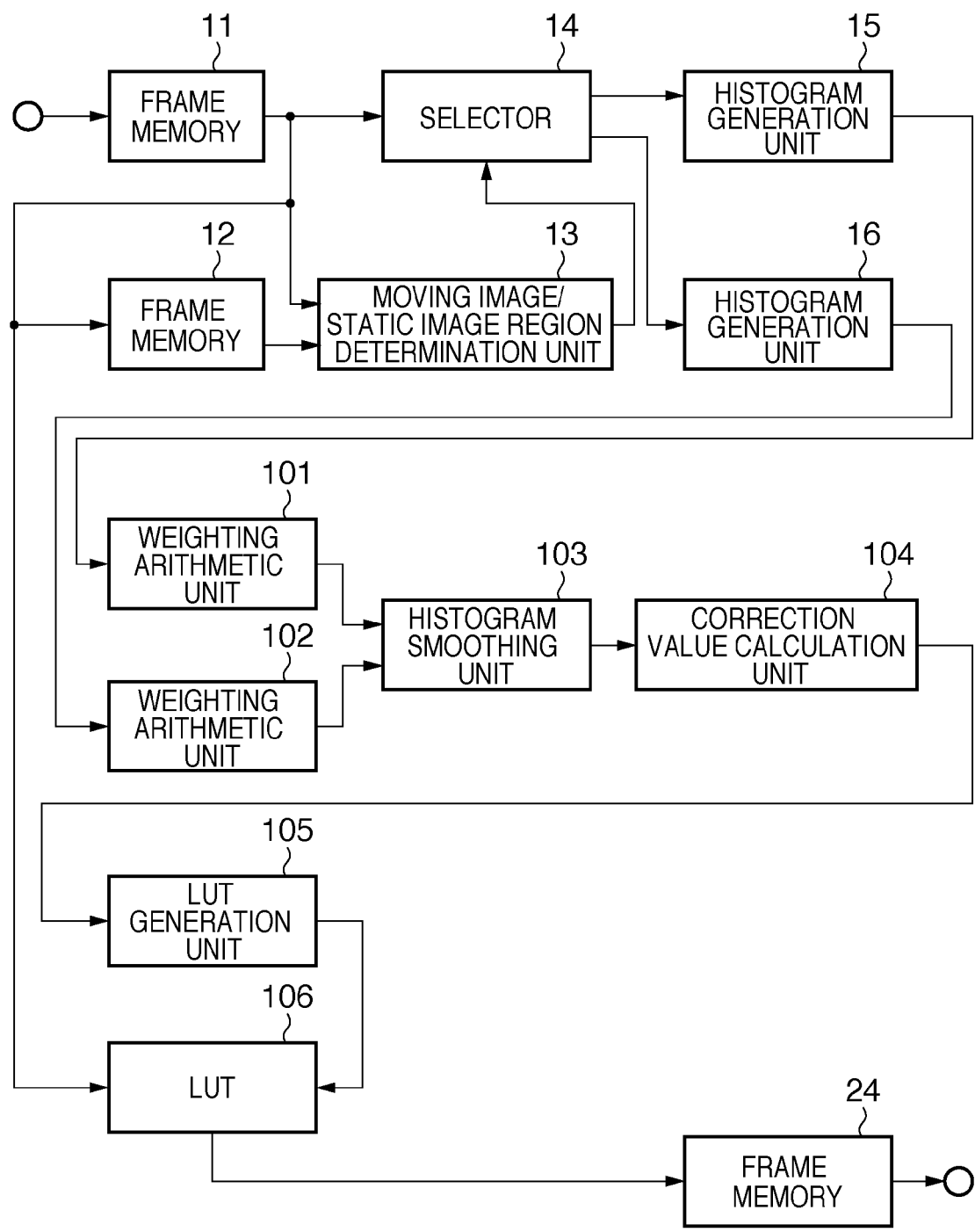
FIG. 3 is a block diagram showing the arrangement of an image processing apparatus in the second embodiment.

FIG. 3 is a block diagram showing the arrangement of an image processing apparatus according to the second embodiment. The components which have the same functions as in the above-described first embodiment shown in FIG. 1 are denoted by the same reference numerals in FIG. 3, and a description thereof will not be repeated.

Referring to FIG. 3, each of weighting arithmetic units 101 and 102 weights a luminance histogram. The weighting arithmetic unit 101 weights the frequency values of the luminance histogram of a moving image region. The weighting arithmetic unit 102 weights the frequency values of the luminance histogram of a static image region. A histogram smoothing unit 103 smoothes the luminance histogram which underwent weighting. A correction value calculation unit 104 calculates correction values from the smoothed luminance histogram. Note that a known method is applicable as the correction value calculation method in the second embodiment. An LUT generation unit 105 generates table data for image correction based on the correction values. An LUT 106 stores table data generated in the LUT generation unit 105. The LUT 106 corrects the image by inputting pixel data read out from a frame memory 11 for each pixel as an address, and outputting the data stored at this address in the table.

[Image Correction]

An image correction operation in the image processing apparatus in the second embodiment with the above-described arrangement will be described below.

As in the above-described first embodiment, each frame image of a moving image is stored in the frame memory 11. A moving image/static image region determination unit 13 divides the current frame image into a moving image region and a static image region. A selector 14 inputs the pixels of the moving image region to a histogram generation unit 15 in accordance with the division result, and inputs those of the static image region to a histogram generation unit 16. The histogram generation unit 15 generates the luminance histogram of the moving image region, and the histogram generation unit 16 generates that of the static image region.

The weighting arithmetic unit 101 inputs a luminance histogram Hm of the moving image region and weights it using a first weight value $\alpha$. That is, letting a luminance value be P, a weighted luminance histogram H'm(P) of the moving image region is expressed by:

$$H'm(P)=Hm(P)\times\alpha \quad (3)$$

A count value Cm also undergoes similar weighting to obtain a weighted count value C'm expressed by:

$$C'm=Cm\times\alpha \quad (4)$$

On the other hand, the weighting arithmetic unit 102 inputs a luminance histogram Hs of the static image region and weights it using a second weight value $\beta$. Note that $\beta>\alpha$, that is, a weight for the static image region is controlled to be larger than that for the moving image region. That is, letting a luminance value be P, a weighted luminance histogram H's(P) of the static image region is expressed by:

$$H's(P)=Hs(P)\times\beta \quad (5)$$

A count value Cs also undergoes similar weighting to obtain a weighted count value C's expressed by:

$$C's=Cs\times\beta \quad (6)$$

The histogram smoothing unit 103 inputs these weighted luminance histograms H'm(P) and H's(P) and weighted count values C'm and C's, and then smoothes them by weighted averaging. That is, letting a luminance value be P, a smoothed luminance histogram H(P) is expressed by:

$$H(P)=\{H'm(P)+H's(P)\}/(C'm+C's)\times 255 \quad (7)$$

The correction value calculation unit 104 calculates a highlight value LH, a shadow value LS, and the like as correction values, like the correction value calculation units 17 and 18 in the above-described first embodiment. The calculated correction values are input to the LUT generation unit 105. The LUT generation unit 105 generates table data indicating the relationship between the input values and the values after the image correction, based on the input correction values, and stores the generated table data in the LUT 106.

When the table of the LUT 106 has been generated in this manner, the pixel data of the current frame input from the frame memory 11 is corrected in accordance with the LUT 106, and the correction result is stored in the frame memory 24. The image data stored in the frame memory 24 is output to the outside of the image processing apparatus for each frame. After that, the frame image in the frame memory 11 is transferred to the frame memory 12.

Figure 4:
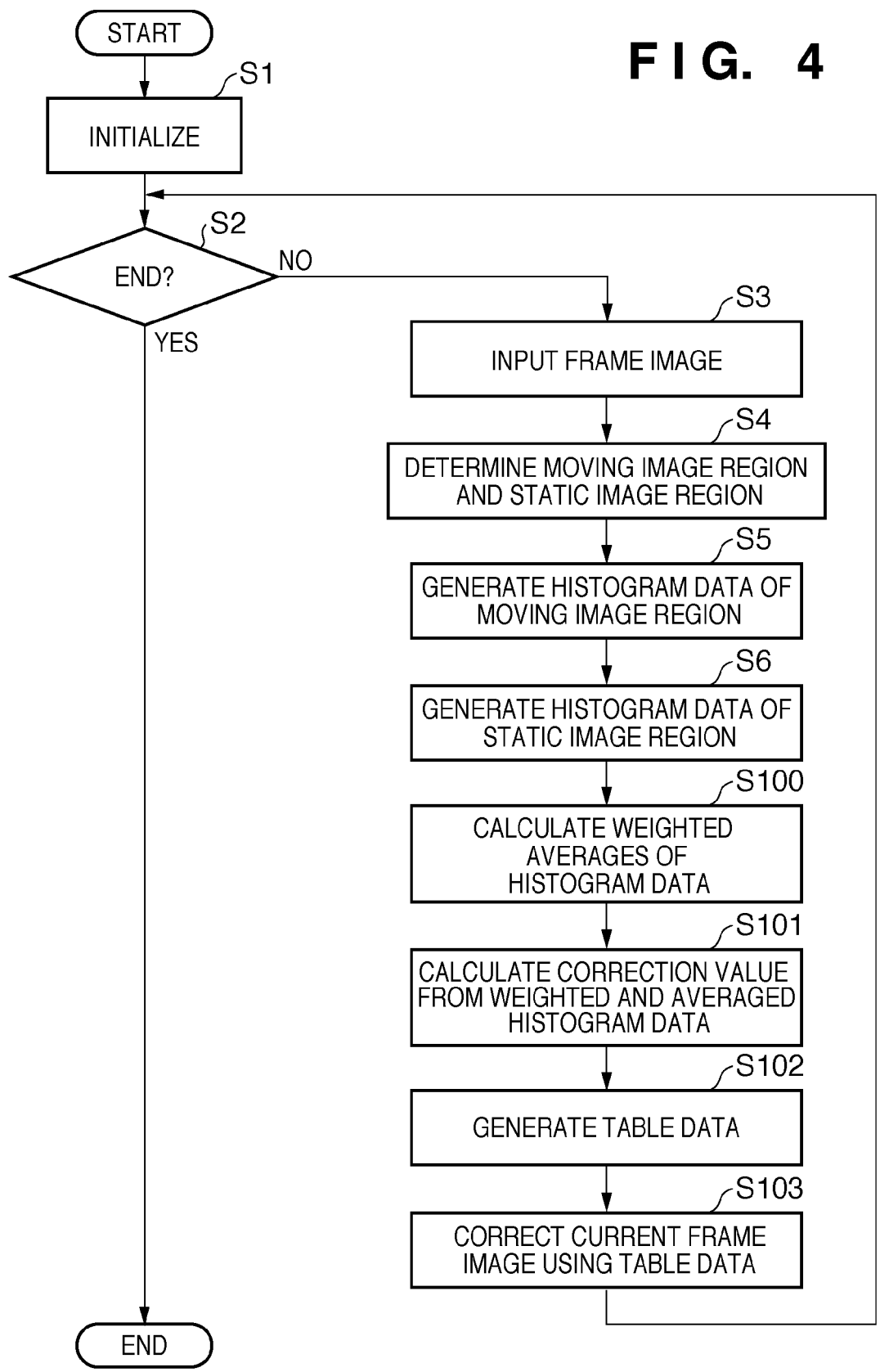
FIG. 4 is a flowchart illustrating image correction processing in the second embodiment.

The sequence of the image processing in the image processing apparatus of the second embodiment outlined above will be outlined using the flowchart in FIG. 4. Note that processes which have the same functions as in the above-described first embodiment shown in FIG. 2 are denoted by the same step numbers in FIG. 4, and a description thereof will not be repeated.

As in the above-described first embodiment, in steps S1 to S6, the respective components of the image processing apparatus are initialized, a frame image is input and divided into a moving image region and a static image region, and histogram data for the respective regions are generated.

The luminance histogram of the moving image region and that of the static image region are weighted and added to calculate a luminance histogram by weighted averaging (S100).

Correction values are calculated from the luminance histogram that underwent weighted averaging (S101), and table data for image correction is generated from the correction values (S102).

The current frame image is corrected using the generated table data, and the corrected frame image is output (S103). The process returns to step S2 to process the next frame.

As has been described above, according to the second embodiment, the weighting arithmetic units 101 and 102 set the weight of the luminance histogram as a feature amount of the static image region to be larger than that of the luminance histogram as a feature amount of the moving image region. After that, the histogram smoothing unit 103 which smoothes the feature amounts performs weighted averaging of the luminance histograms. When a correction LUT is generated based on the luminance histograms that underwent weighted averaging (smoothing), it is possible to perform image correction in which the memory amount for the LUT decreases and the image quality of the static image region is stable.

Third Embodiment

The third embodiment according to the present invention will be described below.

[Arrangement of Apparatus]

Figure 5:
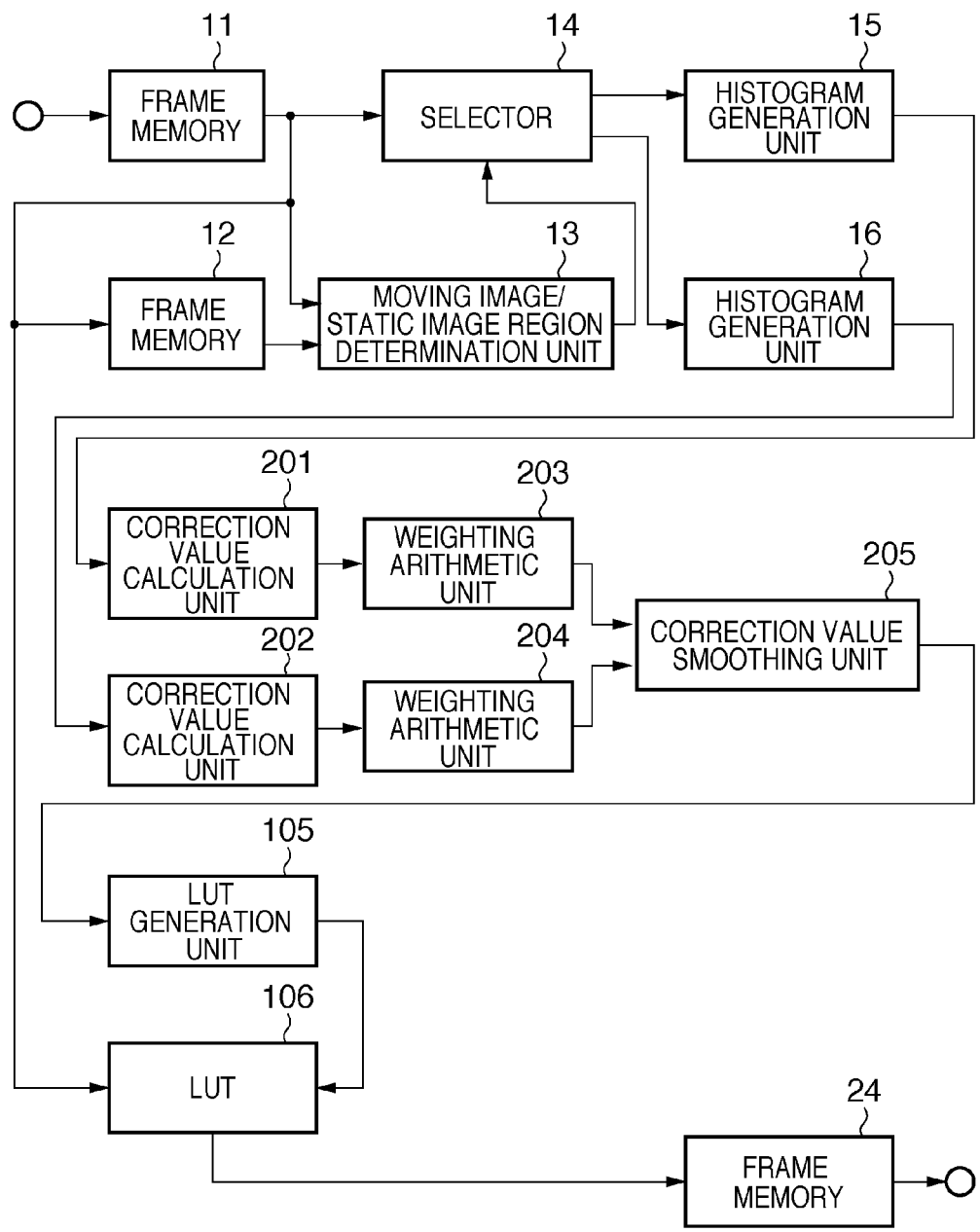
FIG. 5 is a block diagram showing the arrangement of an image processing apparatus in the third embodiment.

FIG. 5 is a block diagram showing the arrangement of an image processing apparatus in the third embodiment. The components which have the same function as in the above-described first and second embodiments shown in FIGS. 1 and 3, respectively, are denoted by the same reference numerals, and a description thereof will not be repeated.

Referring to FIG. 5, each of correction value calculation units 201 and 202 calculates correction values based on a luminance histogram. The correction value calculation units 201 and 202 function like the correction value calculation units 17 and 18 in the above-described first embodiment and the correction value calculation unit 104 in the second embodiment. The correction value calculation unit 201 calculates correction values from the luminance histogram of a moving image region, and a correction value calculation unit 202 calculates correction values from the luminance histogram of a static image region.

Weighting arithmetic units 203 and 204 weight correction values. The weighting arithmetic unit 203 weights the correction value of the moving image region, and the weighting arithmetic unit 204 weights the correction value of the static image region. A correction value smoothing unit 205 smoothes the correction values.

[Image Correction]

An image correction operation in the image processing apparatus of the third embodiment with the above-described arrangement will be described below.

As in the above-described first and second embodiments, each frame image of a moving image is stored in a frame memory 11. Then, a moving image/static image region determination unit 13 divides the current frame image into a moving image region and a static image region, a selector 14 inputs the pixels of the moving image region to a histogram generation unit 15 on the basis of the division result, and inputs those of the static image region to a histogram generation unit 16. The histogram generation unit 15 generates the luminance histogram of the moving image region, and the histogram generation unit 16 generates that of the static image region.

The correction value calculation unit 201 calculates a highlight value LHm, a shadow value LSm, and the like of the moving image region as correction values, like the correction value calculation unit 17 of the above-described first embodiment. Likewise, the correction value calculation unit 202 calculates a highlight value LHs, a shadow value LSs, and the like of the static image region as correction values, like the correction value calculation unit 18 of the first embodiment.

The weighting arithmetic unit 203 inputs the correction values of the moving image region and weights it using a value α. That is, a weighted highlight value L'Hm and a weighted shadow value L'Sm are expressed by:

$$L'Hm = LHm \times \alpha$$

$$L'Sm = LSm \times \alpha \quad (8)$$

Likewise, the weighting arithmetic unit 204 inputs the correction values of the static image region and weights it using a value β (β>α). That is, a weighted highlight value L'Hs and a weighted shadow value L'Ss are expressed by:

$$L'Hs = LHs \times \beta$$

$$L'Ss = LSs \times \beta \quad (9)$$

The correction value smoothing unit 205 inputs these weighted correction values L'Hm, L'Sm, L'Hs, and L'Ss, and obtains smoothed correction values (a highlight value LH and a shadow value LS) using smoothing based on weighted averaging expressed by:

$$LH = L'Hm + L'Hs$$

$$LS = L'Sm + L'Ss \quad (10)$$

After that, table data of the LUT 106 which indicates the relationship between the input values and the values after the image correction is generated in accordance with the smoothed correction values, as in the above-described second embodiment. The pixel data of the current frame input from the frame memory 11 is corrected using the LUT 106, and the correction result is stored in the frame memory 24. The image data stored in the frame memory 24 is output to the outside of the image processing apparatus for each frame. After that, the frame image in the frame memory 11 is transferred to the frame memory 12.

Figure 6:
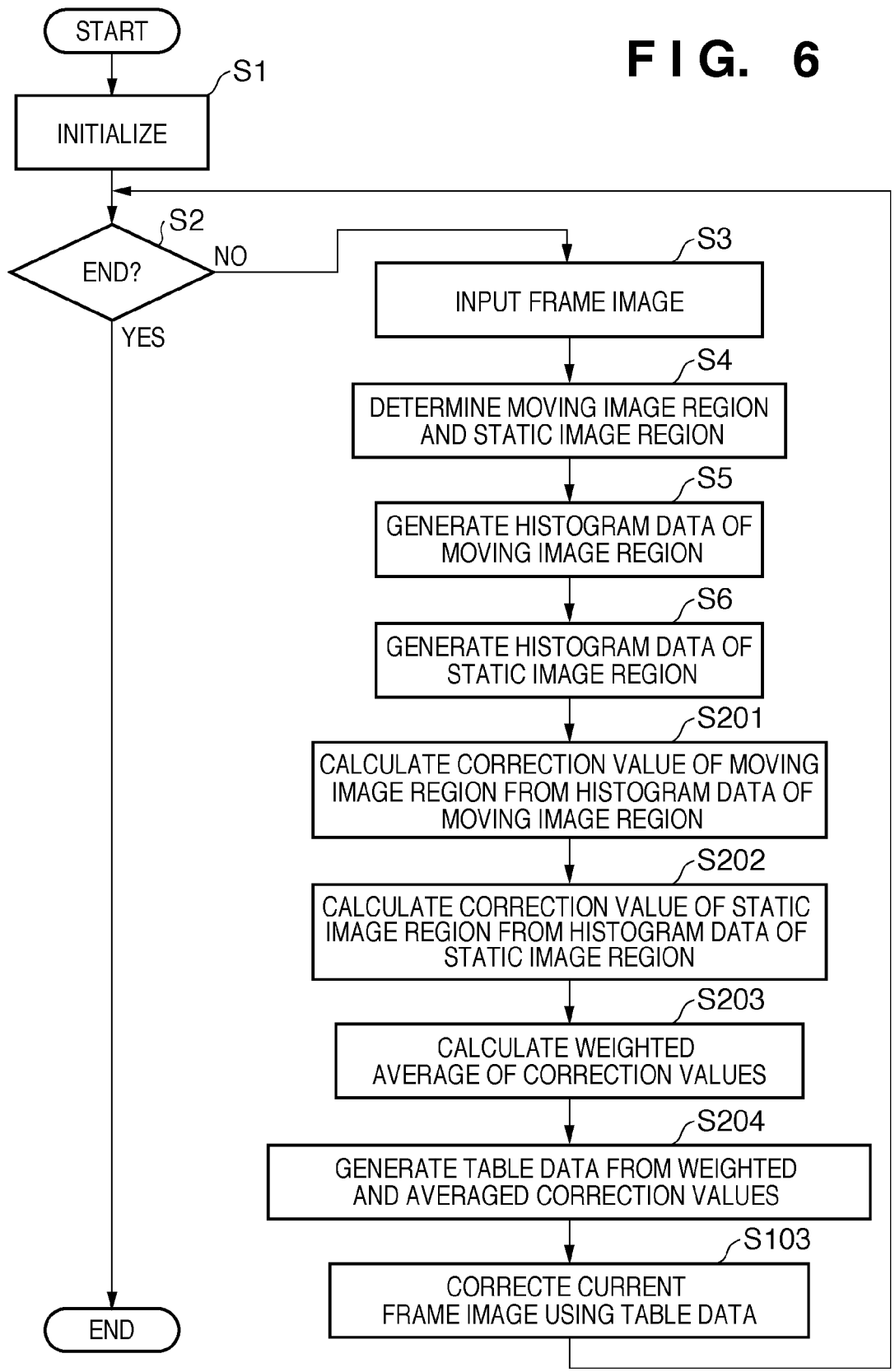
FIG. 6 is a flowchart illustrating image correction processing in the third embodiment.

The sequence of the image processing in the image processing apparatus of the third embodiment described above will be outlined using the flowchart in FIG. 6. Note that processes which have the same functions as in the above-described first and second embodiments shown in FIGS. 2 and 4, respectively, are denoted by the same step numbers in FIG. 6, and a description thereof will not be repeated.

As in the above-described first and second embodiments, in steps S1 to S6, the respective components of the image processing apparatus are initialized, a frame image is input and divided into a moving image region and a static image region, and histogram data for the respective regions are generated.

The correction values of the moving image region are calculated from the luminance histogram of the moving image region (S201), and those of the static image region are calculated from the luminance histogram of the static image region (S202).

Then, the correction values of the moving image region and those of the static image region are weighted and added to calculate correction values that underwent weighted averaging (S203). Table data for image correction is generated from these correction values (S204).

The current frame image is corrected using the generated table data, and the corrected frame image is output (S103). The process returns to step S2 to process the next frame.

As has been described above, according to the third embodiment, the weighting arithmetic units 203 and 204 set the weight of the correction value as a feature amount of the static image region to be larger than that of the correction value as a feature amount of the moving image region. After that, the correction value smoothing unit 205 which smoothes the feature amounts performs weighted averaging of the correction values. When a correction LUT is generated based on the correction values that underwent weighted averaging (smoothing), it is possible to perform image correction in which the amount of memory for the LUT decreases and the image quality of the static image region is stable.

Note that in the above-described first to third embodiments, it is of course possible to cause software to perform the function of each or all the components in the respective embodiments and cause a processor such as a microprocessor (CPU) to execute the processing.

Fourth Embodiment

The fourth embodiment according to the present invention will be described below.

[Arrangement of Apparatus]

Figure 7:
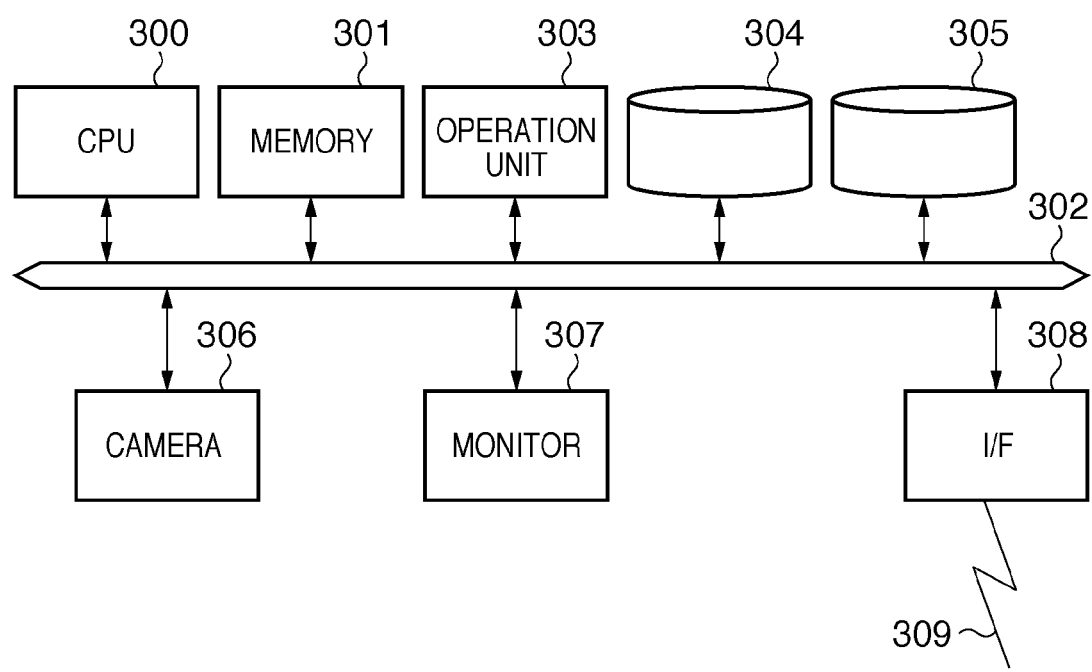
FIG. 7 is a block diagram showing the arrangement of an image processing apparatus in the fourth embodiment.

FIG. 7 is a block diagram showing the arrangement of an image processing apparatus according to the fourth embodiment.

Referring to FIG. 7, a microprocessor (CPU) 300 controls the overall apparatus and performs various kinds of processing. A memory 301 provides a storage area of an operating system (OS) required to operate this apparatus, software, and various kinds of data and a work area required for arithmetic operations in the CPU 300. That is, the memory 301 includes, in addition to the area for storing an OS or software which operates on the image processing apparatus, an image area for storing image data, a code area for storing generated coded data, and a working area for storing parameters used in various operations or a coding process.

A system bus 302 connects the various components to exchange data or a control signal. An operation unit 303 is a user interface for activating the apparatus, setting various conditions, and designating playback. A storage unit 304 is a storage device such as a read-only memory (ROM) or hard disk drive (HDD) for storing an OS, software, or the like. A storage unit 305 is a storage device such as an HDD or a memory card for storing coded data or image data. Note that each of the storage units 304 and 305 may be a removable medium which can be disconnected and removed from the apparatus.

A camera unit 306 captures a moving image frame by frame. A monitor 307 displays a moving image, static image, and user interface. An interface (I/F) 308 connects to a serial bus 309 such as a USB (Universal Serial Bus), IEEE1394, or the like. An interface for connecting to a local area network (LAN), a public network, a wireless network, or the like, instead of the serial bus, may also be used.

In order to simplify the explanation, image data is described to have a tone in which each color is represented by 8-bit data for each pixel in this embodiment. Of course, the present invention is not limited to this example.

[Image Correction]

An image correction operation in the image processing apparatus of the fourth embodiment with the above-described arrangement will be described below.

Before starting the process, the operation unit 303 designates the apparatus to start moving image correction processing, and the respective components are initialized. Various kinds of software required for moving image correction processing, which is stored in the storage unit 304, are loaded into the memory 301 via the system bus 302 and activated.

Figure 8:
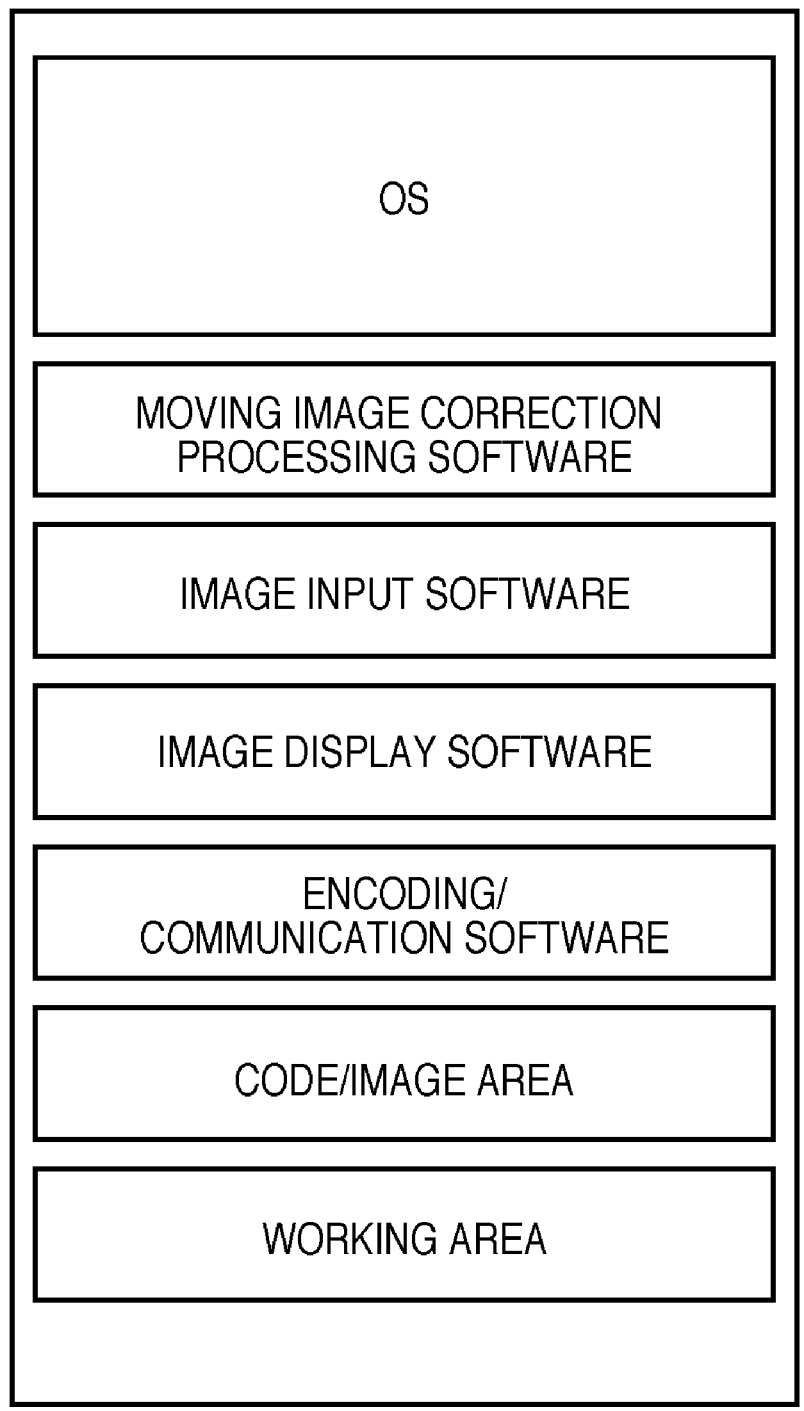
FIG. 8 is a view illustrating an example of the use of a memory in the fourth embodiment.

FIG. 8 shows exemplary areas of the memory 301. As shown in FIG. 8, the memory 301 includes an OS storage area. In the other areas of the memory 301, in addition to moving image correction processing software for executing moving image correction processing in the fourth embodiment, the following types of software are stored: image input software for inputting a moving image frame by frame by controlling the camera unit 306; image display software for displaying an image on the monitor 307; and encoding/communication software for coding a captured moving image and executing communication via the serial bus 309. The memory 301 further includes the code/image area and working area described above.

In the initialization process upon starting moving image correction processing, an area Hm[255] for storing the luminance histogram of a moving image region and an area Hs[255] for storing the luminance histogram of a static image region are assigned to the working area on the memory 301. In addition, an area Lm[255] for storing the table data of the moving image region and an area Ls[255] for storing the table data of the static image region are assigned to it. An area L0[255] for storing table data used to correct an image is also assigned to it.

Likewise, an area IM0 for storing a current frame image captured by the camera unit 306, an area IM1 for storing a previous frame image, and an area IM2 for storing a frame image to be output are assigned to the above-described code/image area on the memory 301. In addition, an area S for storing a determination result of a moving image/static image region is assigned to it.

When the image input software on the memory 301 is activated, a frame image is input from the camera unit 306 frame by frame and stored in the code/image area IM0. The image input software sequentially inputs and stores the frame images, but this process is not particularly described. When the image display software is activated, the frame image stored in the area IM2 is displayed on the monitor 307. The image display software sequentially displays the frame images stored in the area IM2.

Figure 9:
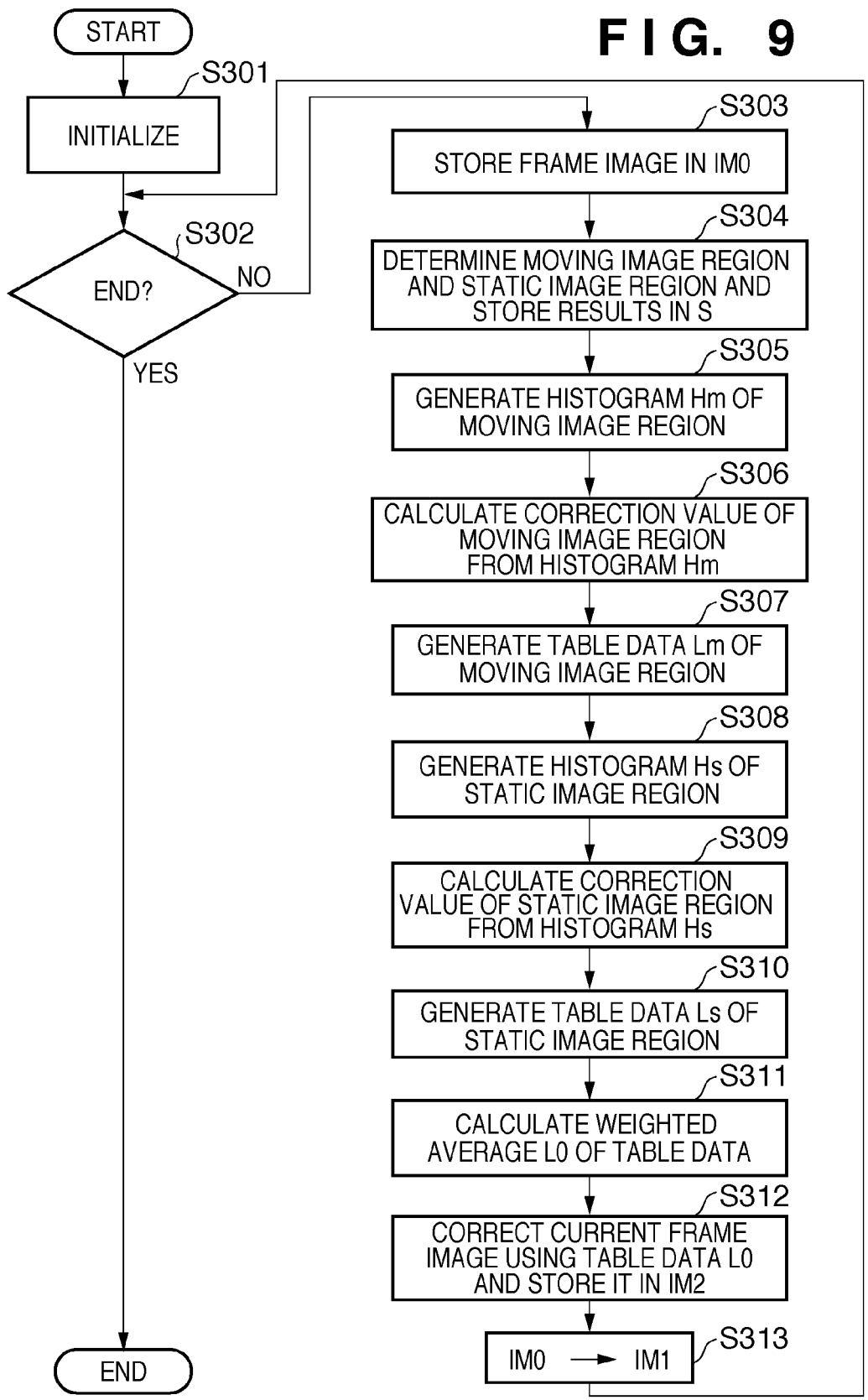
FIG. 9 is a flowchart illustrating image correction processing in the fourth embodiment.

The moving image correction processing software is activated, and moving image correction processing in the fourth embodiment is executed under the control of the CPU 300. Moving image correction processing in the fourth embodiment will be described below by using the flowchart of FIG. 9.

First, the respective memory areas required for moving image correction processing are initialized and cleared (S301).

Then, it is determined whether execution of the moving image correction processing software is to be ended, based on whether the operation unit 303 designates the end of moving image correction processing, or the like (S302). When the execution is to be ended, the respective memory areas used for the moving image correction processing are cleared, and the memory area assigned to the software required for the moving image correction processing is released, thus ending the processing. Otherwise, the process advances to step S303.

When the moving image correction processing is to be continued, the image input software stores a frame image in the area IM0 (S303). A moving image region and a static image region of the current frame image are determined, and the determination results are stored in the area S (S304).

With reference to the determination result stored in the area S, a luminance histogram Hm[ ] of the moving image region of the current frame image is generated (S305). That is, when the luminance value of a pixel included in the moving image region is p, Hm[p] is incremented by 1. According to the luminance histogram Hm[ ] of the moving image region, the correction values (a highlight value LHm and a shadow value LSm) of the moving image region are calculated and stored in the working area on the memory 301 (S306). Based on the correction values LHm and LSm of the moving image region stored in the working area, table data of the moving image region is generated and stored in an area Lm[ ] (S307).

Next, with reference to the determination result stored in the area S, a luminance histogram Hs[ ] of the static image region of the current frame image is generated (S308). That is, when the luminance value of a pixel included in the static image region is p, Hs[p] is incremented by 1. According to the luminance histogram Hs[ ] of the static image region, the correction values (a highlight value LHs and a shadow value LSs) of the static image region are calculated and stored in the working area on the memory 301 (S309). Based on the correction values LHs and LSs of the static image region stored in the working area, the table data of the static image region is generated and stored in an area Ls[ ] (S310).

Table data for image correction is generated from the table data Lm[ ] of the moving image region and the table data Ls[ ] of the static image region and stored in an area L0[ ] (S311). More specifically, letting a weight for the moving image region be α (0≦α<0.5), the table data L0[ ] for image correction is calculated by:

$$L0[j] = \alpha \times Lm[j] + (1-\alpha) \times Ls[j] \quad (11)$$

for j=0, . . . , 255

The pixel values of the current frame image stored in the area IM0 are converted according to the table data L0[ ], and the converted pixels are stored in the area IM2 (S312). That is, the pixel value of the current frame image is set as an address, and data corresponding to this address in the table data L0[ ] is stored in the region IM2 as the converted pixel value.

The frame image stored in the area IM0 is stored in the area IM1 (S313), and the process returns to step S302 to process the next frame.

As has been described above, according to the fourth embodiment, the weight for the table data of the static image region is set larger than that for the table data of the moving image region, and both the table data undergo weighted averaging (smoothing). With this operation, it is possible to perform image correction in which the memory amount for the LUT decreases and the image quality of the static image region is stable.

Note that the fourth embodiment has exemplified a case in which image correction processing is implemented by software. However, it is of course possible to form the function of each or all the components in the fourth embodiment by hardware.

The fourth embodiment has exemplified a case in which an image captured by the camera unit 306 is corrected and displayed on the monitor 307, but the corrected image data may be stored in the storage unit 305. Furthermore, image data stored in the storage unit 305 may be corrected and displayed on the monitor 307. Of course, it is also possible to activate the coding/communication software to code the image data in the area IM2 frame by frame and send the coded data to the serial bus 309 via the I/F 308.

In the first to fourth embodiments, it is simply described that luminance histograms are generated. However, luminance histograms are generated for respective colors (e.g., R, G, and B), and image correction is performed for the respective colors.

Also, a luminance histogram is described to be generated for 256-step luminance values in which each color is represented by 8-bit data. However, for example, a luminance histogram with 64 steps in which luminance values are quantized every four steps may be generated to calculate correction values.

Exemplary Embodiments

The present invention can be applied to a system constituted by a plurality of devices (e.g., a host computer, an interface, a reader, a printer) or to an apparatus comprising a single device (e.g., a copying machine, a facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, and then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides, the above-described functions according to the above embodiments can be realized by executing the program code that is read by a computer, and the present invention includes a case where an OS (operating system) or the like working on the computer performs a part or the entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, a CPU or the like contained in the function expansion card or unit performs a part or the entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-142321, filed May 29, 2007, which is hereby incorporated by reference herein in its entirety.

What is claimed is:

1. An image processing apparatus comprising:
an input section, arranged to input image data forming a moving image in a unit of a frame;

a divider, arranged to divide the image data into a moving image region and a static image region;

a calculator, arranged to calculate a feature amount of the moving image region and a feature amount of the static image region;

a generator, arranged to generate at least one table for image correction based on the feature amount of the moving image region and the feature amount of the static image region; and a corrector, arranged to correct the image data using the table.

2. The apparatus according to claim 1, wherein said generator generates the table for the moving image region based on the feature amount of the moving image region and generates the table for the static image region based on the feature amount of the static image region, and said corrector corrects image data of the moving image region using the table for the moving image region and corrects image data of the static image region using the table for the static image region.

3. The apparatus according to claim 1, further comprising an averaging section arranged to average the feature amount of the moving image region and the feature amount of the static image region, wherein said generator generates the table based on the averaged feature amount of the moving image region and the averaged feature amount of the static image region.

4. The apparatus according to claim 3, further comprising a weighting section arranged to weight the feature amount of the moving image region by a first weight and to weight the feature amount of the static image region by a second weight larger than the first weight, wherein said averaging section averages the weighted feature amounts of the respective regions.

5. The apparatus according to claim 1, wherein the feature amount of the moving image region is a histogram of luminance values of pixels included in the moving image region and the feature amount of the static image reason in a histogram of luminance values of pixels included in the static image region.

6. The apparatus according to claim 1, wherein the feature amount of the moving image region comprises correction values obtained from a histogram of luminance values of pixels included in the moving image region and the feature amount of the static image region comprises correction values obtained from a histogram of lumincance values of pixels included in the static image region.

7. The apparatus according to claim 6, further comprising an averaging section arranged to average the correction values of the moving image region and the correction values of the static image region, wherein said generator generates the table based on the averaged correction values of the moving image region and the averaged correction vales of the static image region.

8. The apparatus according to claim 7, further comprising a weighting section arranged to weight the correction values of the moving image region by a first weight and to weight the correction values of the static image region by a second weight larger than the first weight, wherein said averaging section averages the weighted correction values of the moving image region and the weighted correction values of the static image region.

9. The apparatus according to claim 6, wherein the correction values are a highlight value and a shadow value of the image data.

10. An image processing method comprising the steps of:
inputting image data forming a moving image in a unit of a frame;
dividing the image data into a moving image region and a static image region;
calculating a feature amount of the moving image region and a feature amount of the static image region;
generating at least one table for image correction based on the feature amount of the moving image region and the feature amount of the static image region; and
correcting the image data using the table.

11. A computer-readable storage medium storing a computer executable program for causing a computer to implement an image processing apparatus according to claim 1.

* * * * *